(12) United States Patent
Keller et al.

(10) Patent No.: US 6,408,611 B1
(45) Date of Patent: Jun. 25, 2002

(54) FUEL CONTROL METHOD FOR GAS TURBINE

(75) Inventors: Tim Keller; Mohamad Vhora, both of Albuquerque, NM (US); Dan Burnes, Phoenix; John Lipinski, Tempe, both of AZ (US)

(73) Assignee: Honeywell International, Inc., Morristown, NJ (US)

( * ) Notice: Subject to any disclaimer, the term of this patent is extended or adjusted under 35 U.S.C. 154(b) by 168 days.

(21) Appl. No.: 09/635,609

(22) Filed: Aug. 10, 2000

(51) Int. Cl.[7] ............................................. F02C 9/28
(52) U.S. Cl. ................. 60/39.03; 60/39.281; 60/746
(58) Field of Search .............................. 60/39.03, 39.06, 60/39.281, 746, 747

(56) References Cited

U.S. PATENT DOCUMENTS

| | | | |
|---|---|---|---|
| 4,227,369 A | | 10/1980 | Williams |
| 4,337,616 A | * | 7/1982 | Downing ................. 60/39.281 |
| 4,505,150 A | | 3/1985 | Seymour et al. |
| 4,597,675 A | | 7/1986 | Maertins et al. |
| 4,733,527 A | | 3/1988 | Kidd |
| 4,744,670 A | | 5/1988 | Janssen |
| 4,754,607 A | | 7/1988 | Mackay |
| 5,165,225 A | | 11/1992 | Lampe et al. |
| 5,226,731 A | | 7/1993 | Allen |
| 5,257,496 A | | 11/1993 | Brown et al. |
| 5,257,502 A | * | 11/1993 | Napoli ........................ 60/747 |
| 5,274,996 A | | 1/1994 | Goff et al. |
| 5,465,570 A | * | 11/1995 | Szillat et al. ............... 60/39.06 |
| 5,636,507 A | | 6/1997 | Rajamani et al. |
| 5,855,112 A | | 1/1999 | Bannai et al. |
| 6,062,016 A | | 5/2000 | Edelman |

FOREIGN PATENT DOCUMENTS

| | | |
|---|---|---|
| DE | 199 39 812 A1 | 8/1999 |
| EP | 0 529 900 A1 | 8/1992 |
| GB | 2 287 312 A | 9/1995 |
| WO | WO98/25084 | 6/1998 |
| WO | PCT/US01/25278 | 8/2000 |

* cited by examiner

*Primary Examiner*—Louis J. Casaregola
(74) *Attorney, Agent, or Firm*—Robert Desmond, Esq.

(57) ABSTRACT

A control system and method for controlling the split between premix fuel flow and pilot fuel flow to a combustor in a gas turbine engine so that an acceptable emissions are maintained. Engine speed and exhaust gas temperature are used to obtain a combustor pilot zone temperature that will result in the desired level of emissions. From this pilot zone temperature a desired split between premix fuel flow and pilot fuel flow is obtained and compared to the actual split to generate an error signal. The actual premix fuel flow and pilot fuel flow are then adjusted until the desired split and hence the desired emission levels are obtained.

18 Claims, 4 Drawing Sheets

FUEL CONTROL METHOD FOR GAS TURBINE

TECHNICAL FIELD

This invention relates generally to controlling fuel flow to combustors in gas turbine engines that have pilot fuel flow and premix fuel flow and in particular to a control for adjusting the split between the premix and pilot fuel flows to control flame temperature and thus minimize emissions.

BACKGROUND OF THE INVENTION

Air pollution concerns worldwide have led to stricter emissions standards requiring significant reductions in gas turbine pollutant emissions for both industrial and power generation applications burning either liquid or gaseous fuel.

Among other factors, combustion emissions are dependent upon combustor flame temperature and in particular the peak flame temperature in the primary combustion zone of the combustor. Higher flame temperatures result in lower carbon monoxide (CO) emissions but higher nitrous oxide (NOx) emissions. Depending on the type of fuel used, there is a desired flame temperature wherein the combination of carbon monoxide and nitrous oxide is minimized. This relationship is illustrated in FIG. 1 in which curves of CO and NOx emissions, in parts per million, are plotted versus flame temperature. From this curve an ideal flame temperature can be selected, represented by the dashed line, that minimizes the combination of CO and NOx emissions. Alternatively, the flame temperature can be selected either to the left or right of dashed line for improved CO or NOx emissions at the expense of the other.

One proposed solution to reduce emissions is the use of combustors that operate with two different fuel flows. One of these fuel flows is referred to as pilot fuel flow. This fuel flow is injected directly into the combustion chamber and is the only fuel flow during the starting of the engine. Once the engine has reached a certain percent of its operating speed, premix fuel flow is added to the combustion chamber in addition to the pilot fuel. This premix fuel flow is mixed with air prior to entering the combustion chamber, hence the name "premix". By controlling the ratio of pilot flow to premix flow, the primary zone peak temperature can be adjusted, and therefore, the level of CO and $NO_x$ emissions. An example of this type of combustor is disclosed in copending patent application Ser. No. 09/493,646, filed on Jan. 28, 2000, entitled "Low Cost, Low Emissions Natural Gas Combustor" and which is assigned to the Assignee of this application.

Accordingly, there is a need for a control system and method for controlling the split between the premix fuel flow and the pilot fuel flow to keep emissions down.

SUMMARY OF THE INVENTION

An object of the present invention is to provide a control system and method for controlling the split between the premix fuel flow and the pilot fuel flow to keep emissions down. As used herein, the term "premix split" is the ratio of premix fuel flow to total fuel flow; "pilot split" is the ratio of pilot fuel flow to total fuel flow; and "split" is used to indicate either premix split or pilot split, as appropriate in the context.

The present invention achieves this objective by providing a control system that controls the split between premix fuel flow and pilot fuel flow to a combustor in a gas turbine engine so that an acceptable level of emissions are maintained. This is accomplished by first sensing an operating condition of the engine such as by using engine speed and exhaust gas temperature. Using these sensed parameters, the combustor pilot zone temperature is calculated. In the preferred embodiment, the pilot zone temperature is obtained from the following equation:

$$T_{pz}=(\theta_{EGT})^{k_1} \times (N/\theta^{0.5} \div K_2).$$

From this pilot zone temperature a desired split between premix fuel flow and pilot fuel flow is obtained that will result in the desired level of emissions, and compared to the actual split to generate an error signal. The actual premix fuel flow and pilot fuel flow are then adjusted until the desired split and hence the desired emission levels are obtained.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 2:
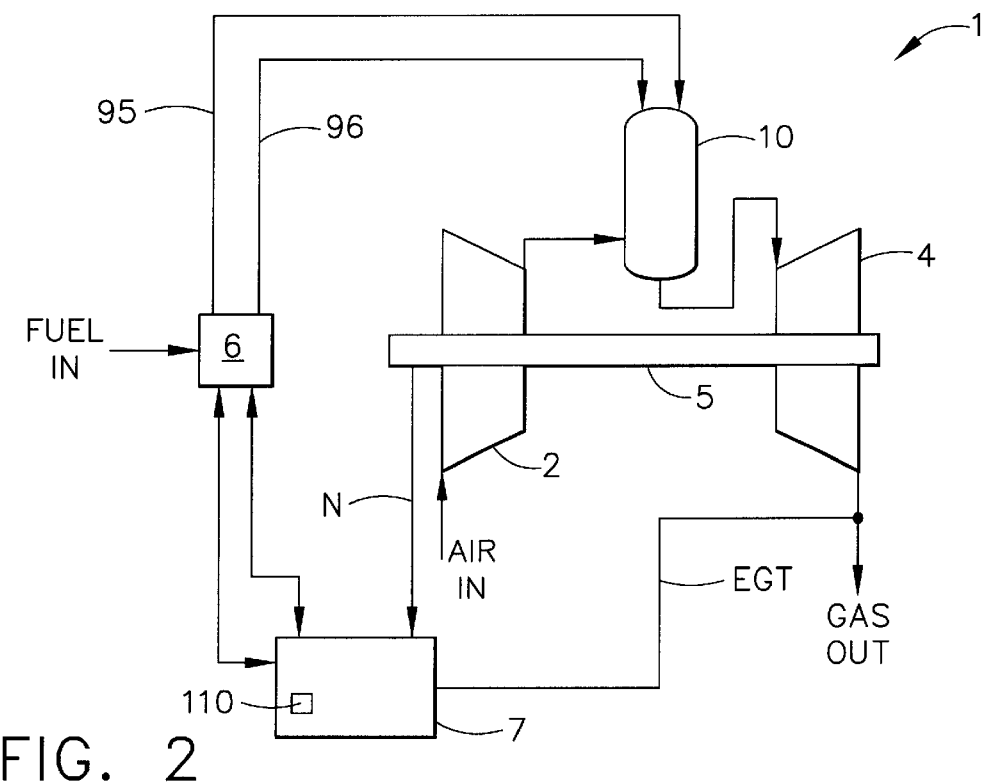
FIG. 2 is a schematic representation of a gas turbine engine.

FIG. 2 shows a gas turbine engine 1 having a compressor 2, and a turbine 4 mounted on a shaft 5. A fuel control unit 6 is controlled by an electronic control unit 7. Disposed between the compressor 2 and the turbine 4 is a low emissions natural gas combustor 10.

In operation, the compressor 2 intakes ambient air, compresses the air and delivers the compressed air to the combustor 10. At the same time, the fuel control unit 6 controls the flow of fuel from a source (not shown) to the combustor 10 through a pilot fuel line 96 and/or a premix fuel conduit 95. The split between the premix fuel flow and the pilot fuel flow is determined by the fuel control unit 6 in response to control signals from the electronic control unit 7. In the combustor 10 the air and fuel are mixed and ignited to form a hot gas that is expanded across the turbine 4. The turbine 4 extracts energy from this gas and converts into power for driving the shaft 5 which in turn drives the compressor 2. The temperature of the gas exiting the turbine 4 is referred to as exhaust gas temperature (EGT) and is sometime given the designation $T_5$.

Though the foregoing description of a gas turbine engine has been made with respect to a single shaft engine having a single compressor and a single turbine, it should be appreciated that the present invention is applicable to gas turbine engines having multiple shafts with multiple compressors and turbines.

Figure 3:
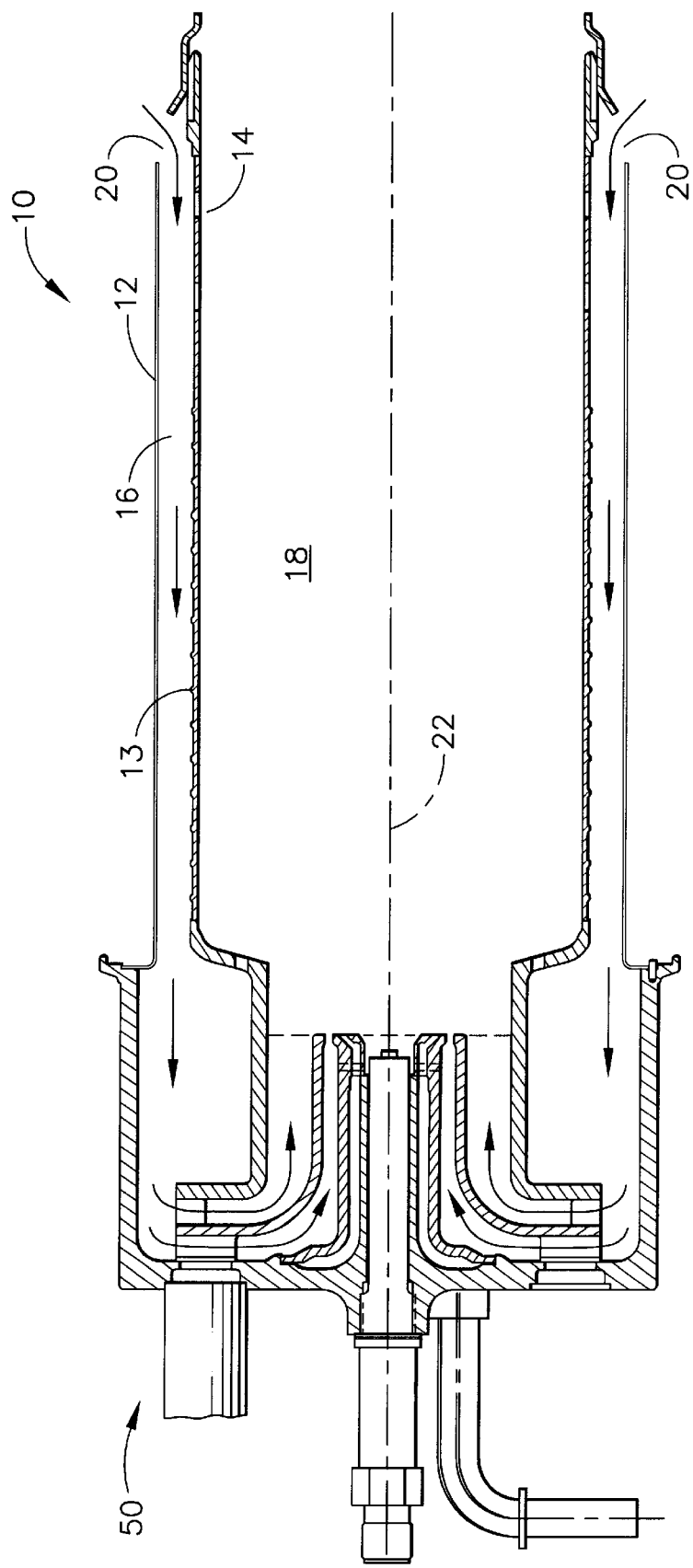
FIG. 3 is a cross-sectional view of a low emissions natural gas combustor with which the control system of the present invention can be used.

FIG. 3 shows an example of a combustor with which the present invention can be used. It will be appreciated that any other pilot/premix type of combustor can also be used. Referring to FIG. 3, the combustor 10 includes an axially extending, annular heat shield 12 surrounding and radially spaced from an annular combustor liner 14 to define an air passage 16 therebetween. The combustor liner 14, in turn, defines a combustion chamber 18. It is within this chamber 18 that most of the combustion process occurs. The heat shield 12 is closed at one axial end by a dome 50. At the opposite axial end, the heat shield 12 has an open annulus 20 and a plurality of holes through which pressurized air from a gas turbine engine enters into passage 16. The entire combustor 10 is symmetric about an axial centerline 22. Turbulators 13 may be mounted on the outer surface of combustor liner 14 to improve convective cooling.

Figure 4:
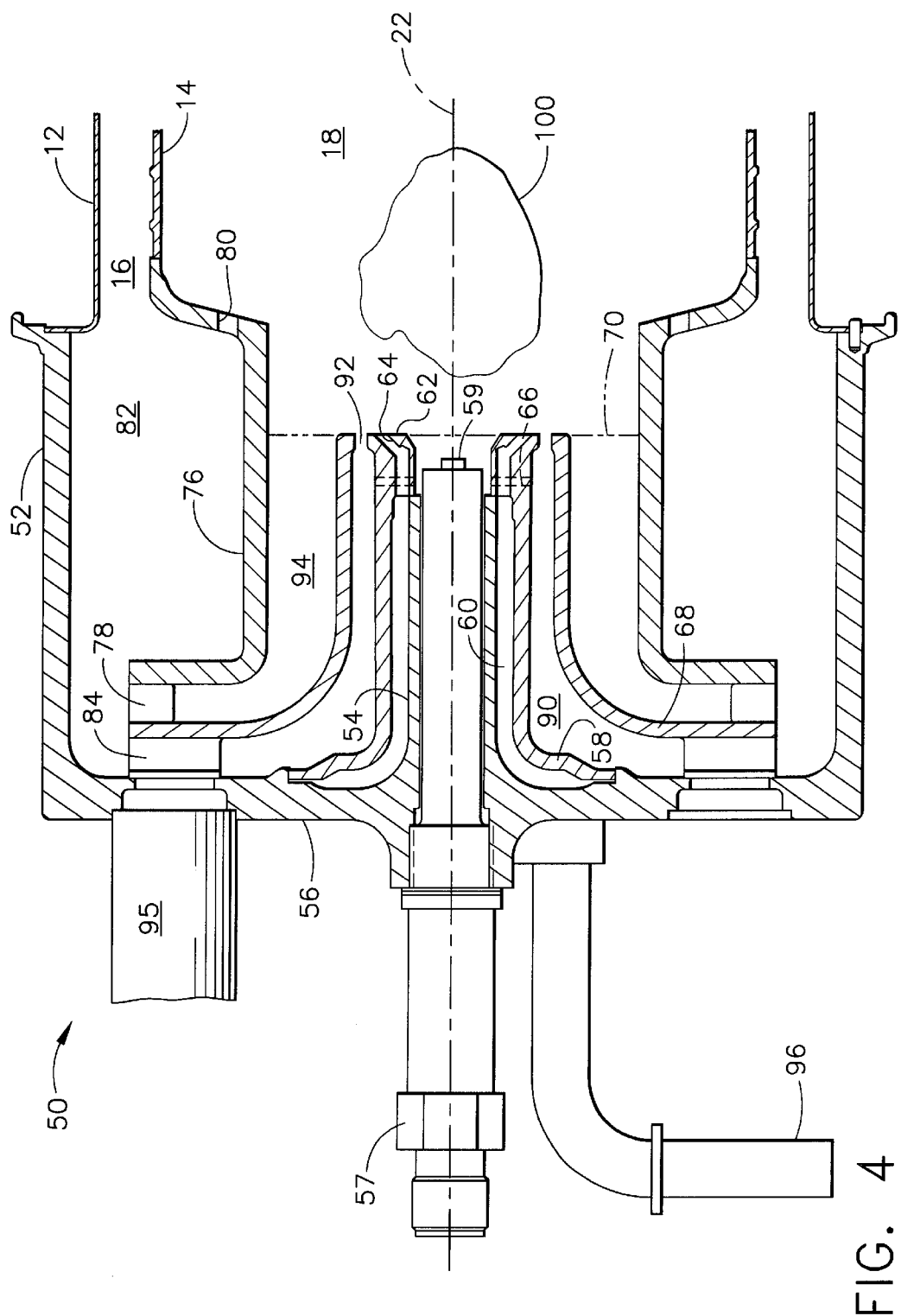
FIG. 4 is an enlarged, cross-sectional view of the dome of the combustor of FIG. 3.

Referring to FIG. 4, the dome 50 is preferably a single cast piece. Alternatively, the dome 50 can be fabricated from separate machined parts welded for tight dimensional control. The dome 50 includes an annular outer wall 52 and annular inner wall 54, and a radially extending wall 56 connecting the wall 52 to the wall 54 at one axial end. At the opposite axial end, the outer wall 52 is attached (e.g., welded, brazed and/or bolted) to the heat shield 12. The inner wall 54 defines an axial bore extending from the wall 56 toward the combustion chamber 18. An igniter 57 is mounted in the bore so that its tip 59 is aligned with the centerline 22. Coaxial about the inner wall 54 is an igniter ring 58. The ring 58 has a radial portion that is attached to radial wall 56 and an axial extending portion. This axial extending portion is radially spaced from the inner wall 54 to define a pilot fuel passage 60. At the end of the axial extending portion is a shroud 62 that connects to the inner wall 54 thereby closing the passage 60. Within the shroud 62 are a plurality of fuel holes 64 slanted at an angle so that the fuel exiting these holes is expelled away from the igniter tip 59 at an angle in the range of about 30 to 60 degrees relative to the center line 22. The shroud 62 also has air holes 66 to provide cooling air to the igniter 57.

Continuing with reference to FIG. 4, radially spaced and concentric with the igniter ring 58 is a premixer inner wall 68. Like the igniter ring 58, the premixer inner wall 68 has a radial portion and axial portion. Both axial portions of the igniter ring 58 and the premixer inner wall 68 end at substantially the same axial distance from a common point such as the wall 56. That is, the axial ends are substantially coplanar as the ends of both of these walls abut an imaginary radial facing plane represented by line 70. Substantially, as used in this application, means within assembly, manufacturing, and electronic control tolerances acceptable to those skilled in the art. Together, the premixer inner wall 68 and the igniter ring 58 define an air passageway 90 that ends at a nozzle 92. Disposed in the air passage 90 at its radial outer end are a plurality of circumferentially spaced apart struts 84. Concentric with the premixer inner wall 68 and radially spaced therefrom is a premixer outer wall 76. The premixer outer wall 76 and inner wall 68 define a premixer chamber or passageway 94. The exits of the premix chamber 94, air passageway 90 and fuel holes 64 are substantially coplanar with respect to an axial facing plane represented by dashed line 70.

The premixer outer wall 76 has an upstream radial portion connected to the radial portion of the premixer inner wall 68 by a plurality of circumferentially spaced apart radial swirler vanes 78. The outer premixer wall 76 also has an axial portion extending from the upstream radial portion to a downstream radial portion that is attached (e.g., welded, brazed and/or bolted) to the combustor liner 14. The extension of the axial portion beyond dashed line 70 improves starting and stability. The downstream radial portion has a plurality of circumferentially spaced apart, axially extending dilution air holes 80. Disposed between the premixer outer wall 75 and the dome outer wall 52 is a plenum 82 in fluid communication with air passage 16.

Figure 1:
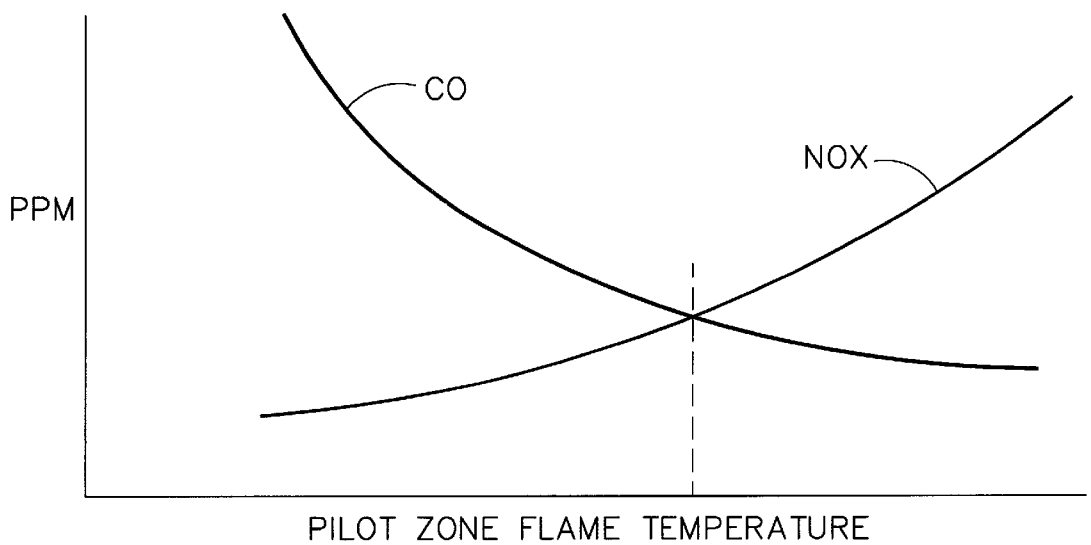
FIG. 1 is a graphical representation of emissions as a function of flame temperature.

During the start of the gas turbine engine in which the combustor 10 is mounted, gaseous pilot fuel, such as natural gas, flows through tube 96 into pilot fuel passage 60. At the same time air flows through passage 16 into plenum 82. From the plenum 82, unswirled air flows through passage 90 and swirled air flows through passage 94. These air flows and pilot fuel flows mix just downstream of the igniter tip 59 which ignites the mixture to form a swirling hot gas referred to as a pilot zone or primary combustion zone, represented generally by circle 100. It is the peak gas temperature in this zone that determines the CO and NOx emissions in accordance with FIG. 1. The pilot zone, by its presence in the combustion chamber 18, sustains the combustion process by assisting in both mixing and igniting as more air and fuel enter the chamber. It should be appreciated that during an engine start, very little air is likely to be available from the engine and therefore the mixture of fuel and air in the pilot zone 100 tends to be fuel rich. To avoid NOx generation, it is important to avoid high concentrations of fuel.

The Applicants have found that this novel arrangement of fuel and air passages results in a more uniform fuel-to-air ratio in the pilot zone and hence results in lower NOx emissions. In a preferred embodiment, once the calculated premix split reaches about 50% (0.5), additional fuel is added through a premix fuel inlet 102 via premix fuel conduit 95. Thus, in this embodiment the combustor is operated using 100% pilot flow (a pilot split of 100%) prior to the introduction of any premix fuel flow, and then the premix fuel flow initiates using a desired 50% premix split. As further described below, the control system 110 then controls the actual premix split to 50%. It is appreciated that the 50% set point is based upon desired flame stability characteristics, and other set points can be used as may be appropriate for a given combustor. The fuel added through the premix fuel inlet 102 flow is referred to as premix flow. The total fuel flow to the combustor 10 is the sum of the both premix flow and the pilot flow. Further, as used herein, the term "premix split" is the ratio of premix fuel flow to total fuel flow; "pilot split" is the ratio of pilot fuel flow to total fuel flow; and "split" is used to indicate either premix split or pilot split, as appropriate in the context.

Referring back to FIG. 2, the electronic control unit 7 receives a signal N indicative of the rotational speed of the shaft 5 and a signal EGT indicative of the exhaust gas temperature at the exit of the turbine 4. These signal are generated by properly mounted sensors in a manner familiar to those skilled in the art. The electronic control unit 7 has control logic that generates a total commanded fuel flow signal Wfc. An example of this type of control logic can be found in LaCroix, U.S. Pat. No. 4,337,615 which is assigned to the Assignee of this application. Electronically integrated into the electronic control unit 7 is a control system 110 for adjusting the split between the premix and pilot fuel flows.

Figure 5:
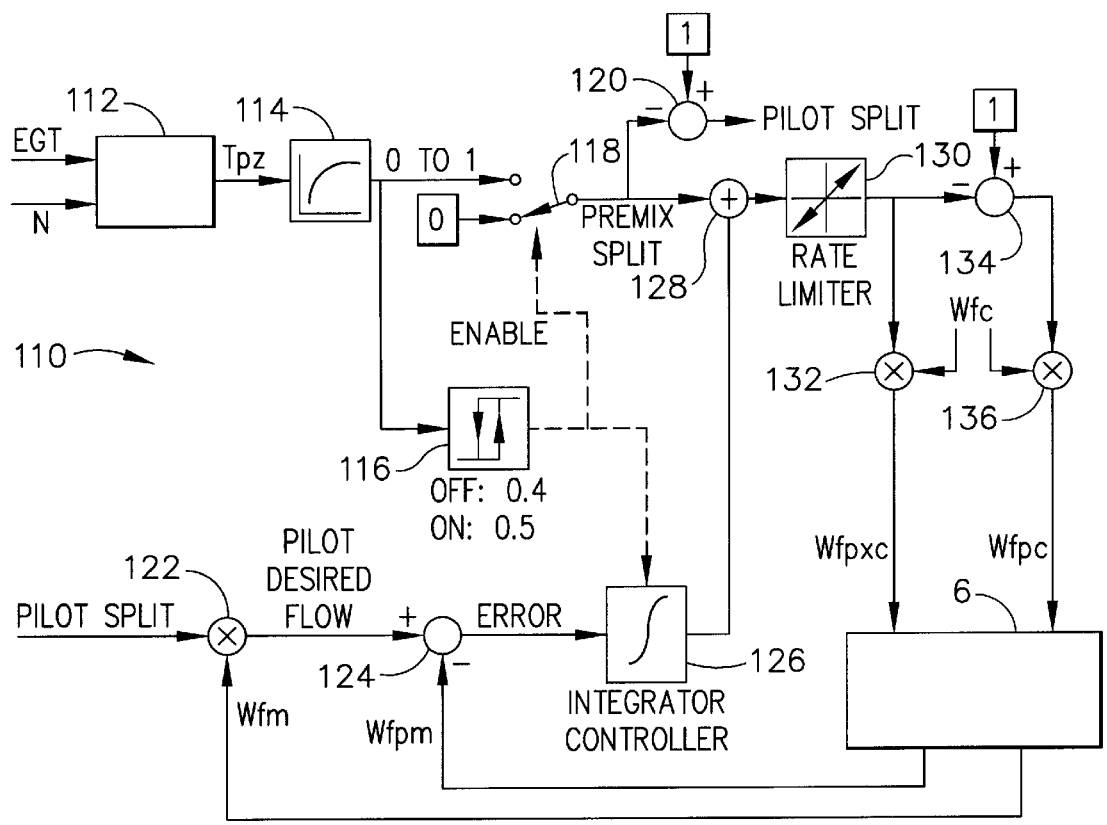
FIG. 5 is a block diagram of the fuel control system contemplated by the present invention.

Referring now to FIG. 5, the control system 110 has a function block 112 that receives the N signal and the EGT signal and generates a signal $T_{pz}$ indicative of the pilot zone gas temperature in accordance with the following algorithm:

$$T_{pz} = (\theta_{EGT})^{k_1} \times (N/\theta^{0.5} \div K_2)$$

where $\theta_{EGT} = (\text{EGT (°F.)} + 459.67)/518.67$, N is in rpm, $\theta$ is a standard day temperature correction factor familiar to those skilled in the art, and $K_1$ and $K_2$ are constants which in a preferred embodiment are 5.5 and 64.76 respectively. These constants are determined from rig testing of the engine and then applying curve fitting techniques to the data to arrive at a Tpz that results in the desired emission in accordance with FIG. 1. In the preferred embodiment the emission goal is CO less than 50 ppm and NOx less than 25 ppm. It should be appreciated that these constants and goals will vary with different engine configurations and the environment in which they operate. A lookup table 114 receives the $T_{pz}$ signal and generates a desired premix split signal which is between 0 and 1.0. This signal represents the ratio of the desired premix fuel flow to the total fuel flow. In an alternative embodiment, instead of the premix signal, a pilot mix signal could be generated. The choice of which is one of convenience. It is only important that this signal be indicative of the desired split between the premix and pilot fuel flows. The elements of control system 110 downstream of lookup table 114 are activated when the engine is accelerating and the premix split signal reaches 0.5 from below. If the engine is decelerating, the elements of control system 110 downstream of function block 116 are deactivated when the premix split signal reaches 0.4 from above. This activation/deactivation is determined by a function block 116 controlling a switch 118 and the integrator controller 126. Closing of this switch (that is, moving the switch from "0" in FIG. 5 to the upper position labeled "0 to 1" in FIG. 5) activates the elements of control system 110 downstream of switch 118.

Figure 5A:
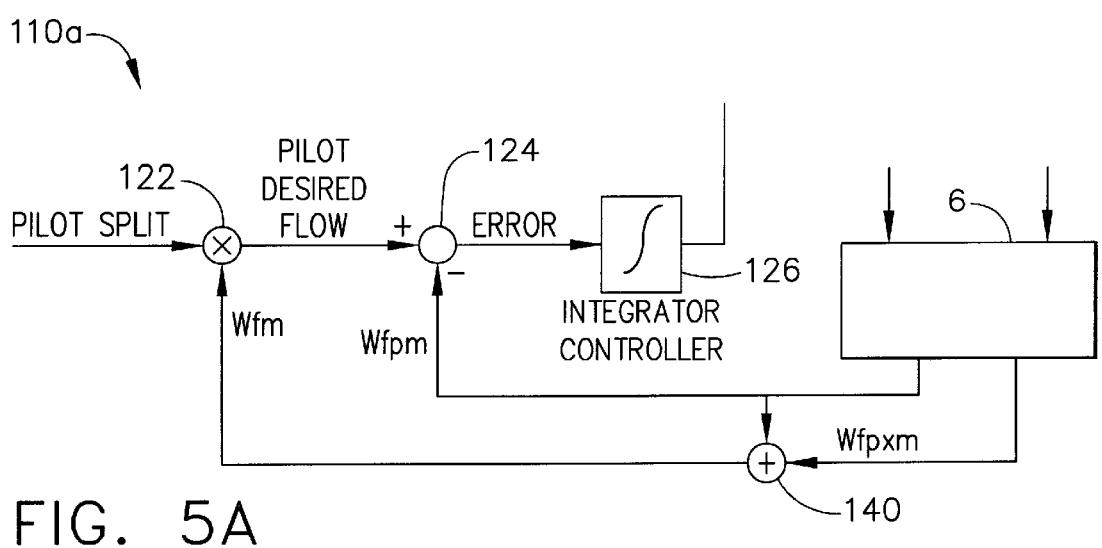
FIG. 5a is a block diagram of an alternative embodiment of the fuel control system of FIG. 5.

With switch 118 closed (in the upper position labled "0 to 1" in FIG. 5) and the integrator controller 126 activated, the premix split signal is subtracted from 1.0 in a summer 120 to arrive at a pilot split signal. At a multiplier 122, the pilot split signal is combined with a signal Wfm indicative of the measured total fuel flow to the combustor 10 to arrive at a desired pilot fuel flow signal. The Wfm signal is generated by a flow meter which is part of the fuel control unit 6. The fuel control unit 6 also has a second flowmeter for providing a signal Wpm indicative of the measured pilot fuel flow. The measured pilot fuel flow signal and the desired pilot fuel flow signal are combined in summer 124 to generate an error signal. In an alternative embodiment, shown in FIG. 5a, the fuel control unit provides a signal Wpxm, from a flowmeter, indicative of measured premix fuel flow instead of the Wfm signal. The Wfm signal is generated by a summer 140 in which Wpm and Wpxm are combined.

Returning to the embodiment shown in FIG. 5, the error signal is then processed in the integrator controller 126 and then added to the premix split signal in summer 128. The combined signal is then processed through a function block 130 which limits how fast the combined signal can change. This is done to prevent transitioning from all pilot to both pilot and premix flow too quickly and causing a lean blow-out of the combustor.

A multiplier 132 multiplies the combined signal from the function block 130 with Wfc to arrive at a premix fuel flow command signal Wfcpx. Concurrently, the combined signal is subtracted from 1.0 in summer 134 and then combined with the Wfc in multiplier 136 to arrive at a pilot fuel flow command signal Wfpc. The fuel control system 6, receives both the premix Wfc signal and the pilot Wfc signal and adjusts the premix and pilot fuel flow. The process is repeated until the error signal substantially goes to zero. At this condition (with the error signal at or approaching zero) the engine is operating at a split between premix fuel flow and pilot fuel flow that results in the desired level of CO and NOx emissions.

Various modifications and alterations to the above-described preferred embodiment will be apparent to those skilled in the art. For example, instead of EGT the gas temperature in another part of the engine can be used or the speed or temperature can be used by itself. Accordingly, these descriptions of the invention should be considered exemplary and not as limiting the scope and spirit of the invention as set forth in the following claims.

What is claimed is:

1. A method for controlling the split between premix fuel flow and pilot fuel flow to a combustor in a gas turbine engine comprising the steps of:
    a) sensing an operating condition of said engine and generating a first signal thereof;
    b) generating a second signal indicative of a desired pilot zone temperature ($T_{pz}$) in said combustor from said first signal;
    c) generating a third signal indicative of a desired split between said premix fuel flow and said pilot fuel flow from said second signal;
    d) sensing at least one parameter from which one of either the actual premix fuel flow or actual pilot fuel flow can be determined, and generating a fourth signal indicative of said one of actual premix fuel flow or said actual pilot fuel flow;
    e) comparing said fourth signal to said third signal and generating an error signal therefrom; and
    f) adjusting the actual premix fuel flow and the actual pilot fuel flow to said combustor until said desired split is substantially reached.

2. The method of claim 1 wherein step (a) includes sensing at least two parameters indicative of the operating condition of said engine.

3. The method of claim 2 wherein said at least two parameters are engine speed (N) and a gas temperature in a turbine section of said engine.

4. The method of claim 3 wherein said gas temperature is exhaust gas temperature (EGT).

5. The method of claim 4 wherein step (b) includes solving the following equation:

$$T_{pz}=(\theta_{EGT})^{k1}\times(N/\theta^{0.5}\div K_2)$$

where $K_1$ and $K_2$ are predetermined constants.

6. The method of claim 1 further comprising between steps (c) and (d) the step of continuing said method if said engine is accelerating and said third signal is at a first predetermined magnitude.

7. The method of claim 1 further comprising between steps (c) and (d) the step of stopping said method if said engine is decelerating and said third signal is at a second predetermined magnitude.

8. The method of claim 1 wherein step (c) includes the step of generating a premix split signal and a pilot split signal.

9. The method of claim 8 wherein step (c) includes the steps of generating a fifth signal indicative of the total fuel flow to the combustor and combining said fifth signal with said pilot split signal to arrive at said third signal.

10. The method of claim 9 wherein said step of generating said fifth signal includes sensing the total fuel flow to the combustor.

11. The method of claim 9 wherein said step of generating said fifth signal includes sensing the pilot fuel flow to the combustor, sensing the premix fuel flow the combustor and adding these two sensed fuel flows.

12. The method of claim 9 wherein step (d) includes the step of sensing the actual pilot fuel flow to said combustor to arrive at said fourth signal.

13. The method of claim 8, further comprising between steps (e) and (f) the step (e') of adding said error signal to said premix split signal and generating a sixth signal thereof.

14. The method of claim 13 wherein step (e') further comprises the step of combining said sixth signal with a total fuel flow commanded signal to arrive at a commanded premix fuel flow signal.

15. The method of claim 14 wherein step (e') further comprises the step of generating a seventh signal by subtracting said sixth signal from 1.0.

16. The method of claim 15 wherein step (e') further comprises the step of combining said seventh signal with said total fuel flow commanded signal to arrive at a commanded pilot fuel flow signal.

17. The method of claim 1 wherein step (e) includes the step of processing said error signal in an integrator controller.

18. The method of claim 1 wherein step (f) further comprises the step of limiting how fast the error signal can change.

* * * * *